United States Patent [19]

Rose

[11] Patent Number: 4,831,350
[45] Date of Patent: May 16, 1989

[54] ROTARY SHAFT POSITION REED SWITCH
[75] Inventor: John F. Rose, Underwood, Minn.
[73] Assignee: Proximity Controls, Inc., Fergus Falls, Minn.
[21] Appl. No.: 126,972
[22] Filed: Nov. 30, 1987
[51] Int. Cl.[4] .............................. H01H 36/00
[52] U.S. Cl. ..................... 335/205; 335/206
[58] Field of Search ............ 335/205, 206, 207; 200/31 R

[56] References Cited

U.S. PATENT DOCUMENTS

| | | |
|---|---|---|
| 780,770 | 1/1905 | Woods . |
| 1,708,276 | 4/1929 | Marks . |
| 1,767,617 | 6/1930 | Ronning et al. . |
| 1,989,522 | 1/1935 | McWhirter . |
| 2,241,983 | 5/1941 | Connolly . |
| 2,564,676 | 8/1951 | Crouse . |
| 2,651,550 | 8/1953 | Sharp . |
| 2,725,439 | 11/1955 | Newboult . |
| 2,915,606 | 12/1959 | Knauth . |
| 2,966,330 | 12/1960 | Binford . |
| 3,128,909 | 4/1964 | Shield et al. . |
| 3,224,295 | 12/1965 | Ardern . |
| 3,315,523 | 4/1967 | Conkling . |
| 3,503,024 | 3/1970 | Iwaski . |
| 3,538,948 | 11/1970 | Nelson et al. . |
| 3,743,872 | 7/1973 | Dochterman . |
| 3,747,892 | 7/1973 | Gigantino et al. . |
| 3,791,620 | 2/1974 | Scott . |
| 3,825,781 | 7/1974 | Woods . |
| 4,214,133 | 7/1980 | Wolford et al. . |
| 4,225,837 | 9/1980 | Fowler . |
| 4,518,940 | 5/1985 | Fuchs . |
| 4,544,903 | 10/1985 | Grant . |

FOREIGN PATENT DOCUMENTS

| | | |
|---|---|---|
| 1040571 | 9/1966 | United Kingdom . |
| 1205145 | 9/1970 | United Kingdom . |
| 1291579 | 10/1972 | United Kingdom . |
| 1324027 | 7/1973 | United Kingdom . |

Primary Examiner—H. Broome
Attorney, Agent, or Firm—Merchant, Gould, Smith, Edell, Welter & Schmidt

[57] ABSTRACT

A switch for providing signals indicating the position of a rotary shaft has an enclosed switch chamber. Within the chamber is at least one magnetically actuated switch device. A switch actuating magnet is mounted in a holder exterior of the chamber and coupled to the switch through a wall of the switch housing. The holder is flexibly mounted to the housing and connected to the rotary shaft. The magnet is held in a constant rotational plane with respect to the switch.

7 Claims, 3 Drawing Sheets

ROTARY SHAFT POSITION REED SWITCH

BACKGROUND OF THE INVENTION

The present invention relates to a device providing a signal indicating the rotational position of a rotary shaft. The device is particularly suitable for application in adverse environmental conditions, such as corrosive and/or explosive chemical environments. The application of the present invention specifically relates to fluid and other flow systems in which it is considered desirable t monitor the condition of rotary valves (i.e. open or closed) and/or to control the opening or closing of successive valves in the flow lines as a function of the state of preceding valves. The prior art included electrical switches that are mechanically activated in response to this operative state of the rotary valve. Such mechanically activated switches were frequently subjected to severe conditions to include dust, moisture, or other corrosive explosives or foreign matter. These environmental conditions tend to have a harmful effect on the electrical switching and over a period of time could lead to switch malfunctions causing erronous indicator and control signals.

The prior art also includes U.S. Pat. No. 4,214,133. The applicant of the present invention was co-inventor of the subject matter disclosed and claimed in that patent. U.S. Pat. No. 4,214,133 solved the problems that were associated with the other prior art devices by providing a rotary shaft position indicator and control in which the electrical switch gear is enclosed within a housing that is sealed against the introduction of adverse matter. Switches are activated by a magnetic coupling through a wall of the housing. In one embodiment, the electrical switching is accomplished by a plurality of microswitches actuated by rotatably driven cams. The cams are driven by a magnetic coupling between two disks or annular magnets, one of the magnets being disposed outside of the housing. In an alternative embodiment, the microswitches are actuated by spring biased switch actuating arms on which were mounted bar-type magnets. A plurality of driving bar magnets are disposed outside of the housing in proximity to the housing wall to actuate an associated microswitch within the housing.

While the switch disclosed in U.S. Pat. No. 4,214,133 provided a sealed switch cavity it can be seen that the switch and switch actuating structure requires many mechanical components. The present device provides for less complex structure by utilizing magnetically actuated reed switches. These are particularly desirable in low voltage and low current applications. The present invention combines the advantages of the structure disclosed in U.S. Pat. No. 4,214,133 with the advantages of reed switch actuation.

SUMMARY OF THE INVENTION

The present invention is a rotary shaft position indicator and control with a housing that defines a switch chamber. The switch means are mounted within the switch cavity to provide an indicator or control signal. Exterior of the housing is a switch actuating structure that comprises a magnet holder that is flexibly mounted to the housing for rotation about a rotational axis. Flexible mounting permits this rotational axis to be misaligned angularly with respect to an axis perpendicular to the wall of the housing. A magnet is mounted on the holder and there is provided a means for maintaining the magnet in a constant rotational plane with respect to the magnetically actuated switch means to insure accurate and reliable switch actuation. Finally, there is a means for connecting the switch actuating means to the rotary shaft. The connecting means has a flexible coupling to the shaft so that the rotational axis of the shaft may be misaligned with respect to the rotational axis of the switch actuating means. This allows for tolerance in the mounting of the switch to the shaft and accommodates changes in alignment that might occur during operation.

These and other advantages of the invention will become apparent with reference to the accompanying drawings, specification and claims.

DETAILED DESCRIPTION OF THE PREFERRED EMBODIMENT

Figure 1:
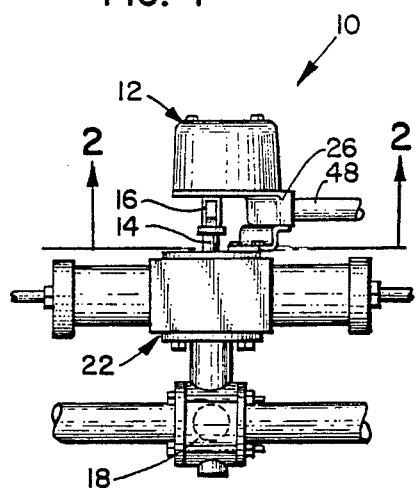
FIG. 1 is a side elevational view of the rotary shaft position indicator and control of the present invention operatively mounted to sense the position of a valve mechanism.
Figure 2:
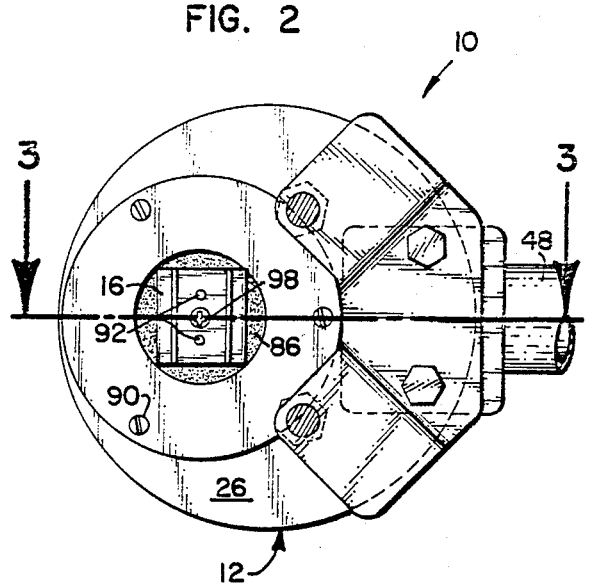
FIG. 2 is an enlarged end elevational view of the position indicator and control seen generally from the line 2—2 of FIG. 1.
Figure 3:
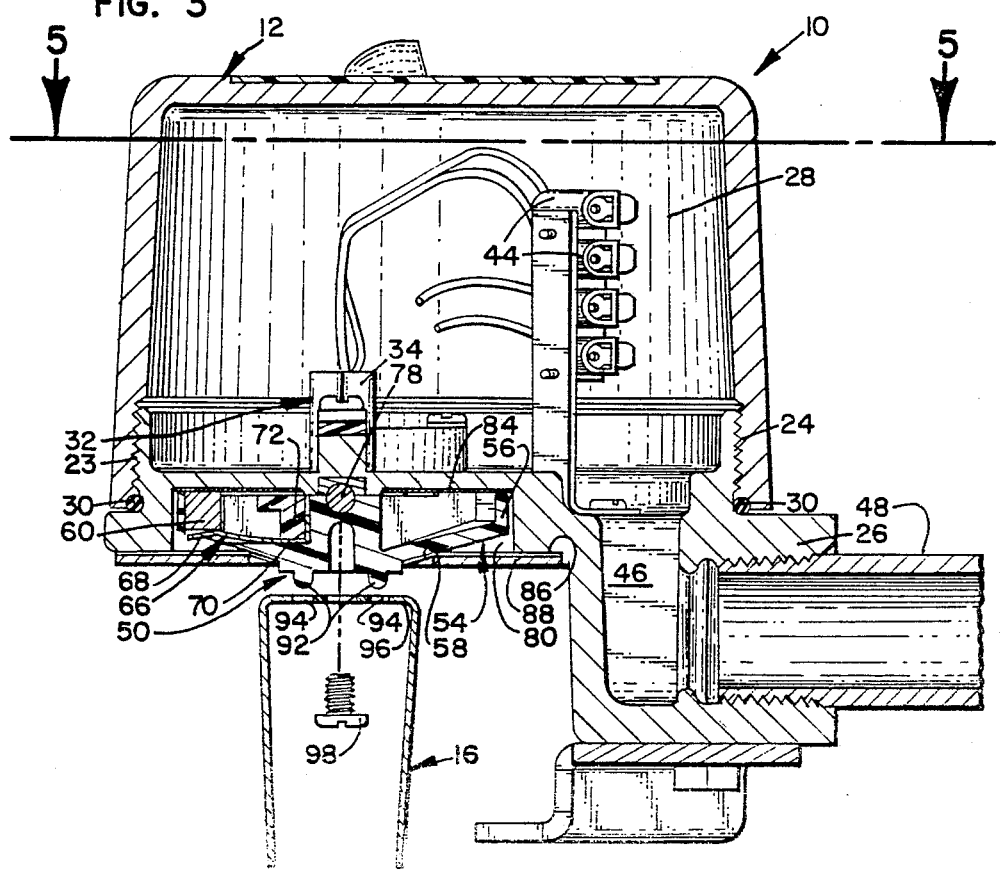
FIG. 3 is an enlarged axial sectional view as seen from line 3—3 of FIG. 2.

Referring to the drawings, wherein like numerals represent like parts throughout the several views, a preferred embodiment of the present invention is illustrated in FIG. 1 operatively connected to a rotary valve. The rotary shaft position indicator and control is indicated generally at 10 and has a cylindrical first housing member 12. The indicator and control 10 is coupled to a rotary shaft 14 by means of a spring clip 16. Secured to rotary shaft 14 is a disk or butterfly type valve member 18 which controls fluid flow through a conduit 20. In the embodiment illustrated in FIG. 1, positioning of valve member 18 is accomplished by a pneumatic actuating device 22.

Rotary position indicator and control 10 will now be described more particularly with reference to FIGS. 2-5 and FIG. 7. Cylindrical housing member 12 is threaded internally at 23 to mate with external threads 24 on the second housing member 26. Housing members 12 and 26 define a switch cavity 28. An O-ring seal 30 is provided proximate the threaded connection between housing members 12 and 26 and is compressed when housing member 12 is screwed onto housing member 26.

Disposed within switch cavity 28 in this embodiment is a pair of conventional reed switches 32 and 34. Reed switches 32 and 34 are mounted on the second housing member 26 using screws 36, 38 and 40. A plurality of threaded holes 42 are provided to receive the screws 38 and 40. The positioning of the reed switches 32 and 34 can thus be varied about the screw 36 which is aligned generally with tee rotational axis of the actuating magnet. This features allows the rotary shaft indicator and switch to be modified for specific applications. In other words the reed switches can be placed at different positions to indicate various operating conditions of the rotary shaft. A terminal connector 44 is provided to connect conductive wires 45 from the reed switches, to conductive wires (not shown) that lead from switch cavity 28 through a channel 46 in housing member 26 and from there into an electrical conduit 48 threadably connected to housing member 26.

As stated above reed switches 34 an 36 are of the conventional type which are actuated (or deactuated) in the presence or absence of a magnetic field.

A switch actuating means 50 is mounted to the exterior of a wall 52 of second housing member 26 Switch actuating means 50 includes a magnet holder 54. Magnet holder 54 is generally cup-shaped with a side wall 56 and an integral frusto-conical portion 58. An actuating magnet 60 may be mounted within either one of three channel members 62 defined by walls 63. Magnet 60 is somewhat loosely received within a magnet receiving portion at 64 of channel member 62. Magnet receiving portion 64 is disposed at the outer periphery of magnet holder 54 proximate sidewall 56. In the preferred embodiment channel members 62 are aligned 120° apart about magnet holder 54.

A leaf spring 66 is received within channel member 62 and has a peripheral portion 68 intended to rest against magnet 60. An opposite end 70 of leaf spring 66 is firmly retained within channel 62 by a retaining member 72 which is press or snap fitted within a receiving portion 74 of channel member 62. At the central axis of magnet holder 54 where channel members 62 join there is a recess 76 in which is received a ball bearing 78. While the preferred embodiment shown in the drawings illustrates only one magnet 60, it should be understood that depending upon the particular application additional magnets could be utilized in the other channels 62 and moreover, the provision of three separate channel members 62 allows for placement of an actuating magnet 60 at various positions with respect to the spring clip 16 which receives the stub end of the rotary shaft.

Magnet holder 64 is received within a recessed chamber 80 formed on the exterior side of wall 52 in housing member 26. A raised portion 82 is adapted to receive ball bearing 78 and capture ball bearing 78 between wall 52 and magnet holder 54. A washer 84 is provided and is preferably of some suitable plastic or Teflon ® material. Magnet 60 is continually biased by spring 66 into contact with washer 84. Washer 84 insures that there is no metal to metal contact between wall 52 and magnet 60 which could result in degradation or damage to magnet 60 over time.

Figure 6:
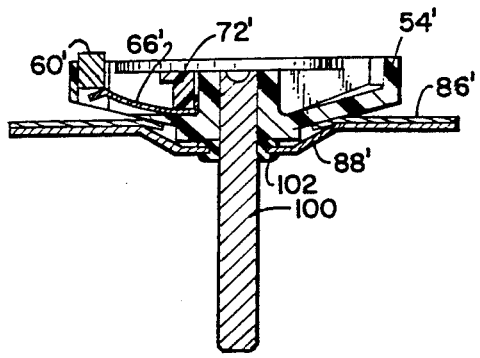
FIG. 6 illustrates an alternative embodiment of the magnet holder of the present invention.
Figure 7:
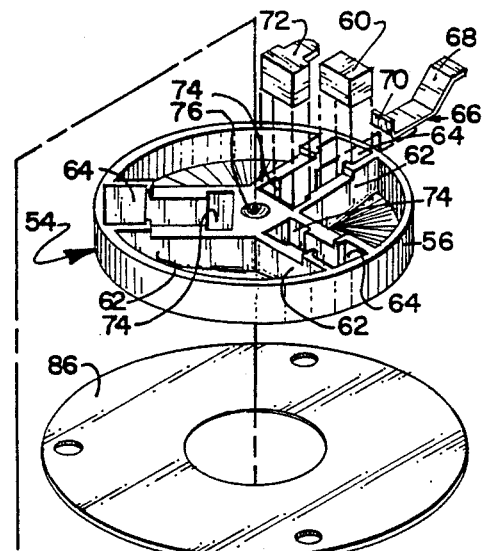
FIG. 7 is an exploded perspective view illustrating the mounting of the switch actuating structure to the housing.
Figure 7:
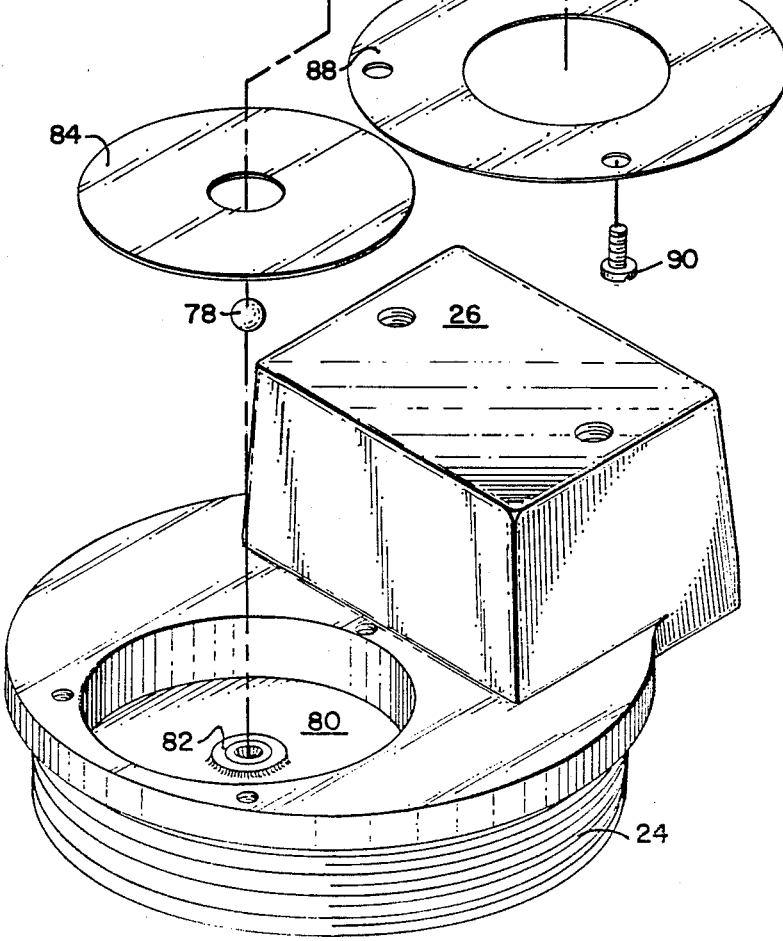

Magnet holder 54 is held within chamber 80 by a pair of cooperating washer members 86 and 88. Washer 86 is preferably a flexible material and engages the frustro-conical portion 58 of magnet holder 54. Because of its flexibility, washer 86 accommodates some canting or misalignment of magnet holder 54 within chamber 80 as shown more particularly in FIG. 4. Washer 88 is a metal plate secured to housing member 26 by threaded fasteners 90. Frustro-conical portion 58 of the magnet holder 54 has a pair of outwardly projecting pins 92 which are received within openings 94 in the base portion 96 of spring clip 16. Clip 16 is secured to magnet holder 54 by a screw 98. FIG. 6 illustrates an alternative embodiment of magnet holder 54'. The essential difference between magnet holder 54' and magnet holder 54 is that magnet holder 54' is mounted on a shaft 100 which is received by a bearing 102 mounted to washer 88'. The magnet holder of 54' will not allow the degree of misalignment provided by magnet 54 and the associated clip 16 as will be described in more detail hereafter.

Figure 4:
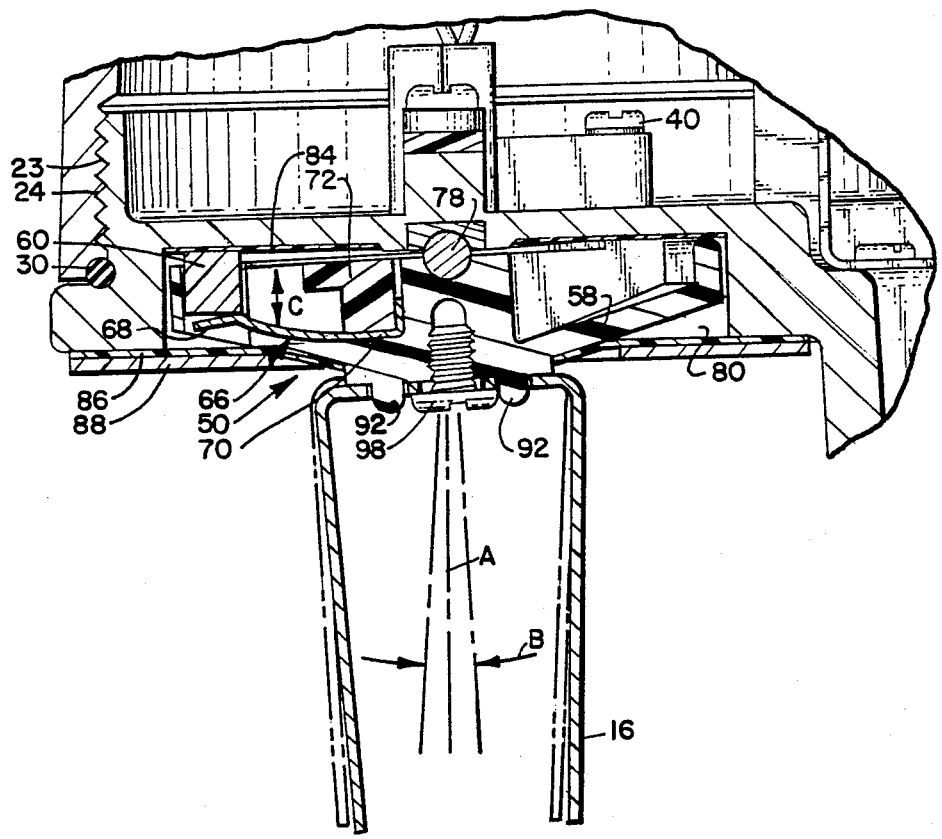
FIG. 4 is a enlarged fragmentary sectional view taken from FIG. 3 with portions thereof broken away.
Figure 5:
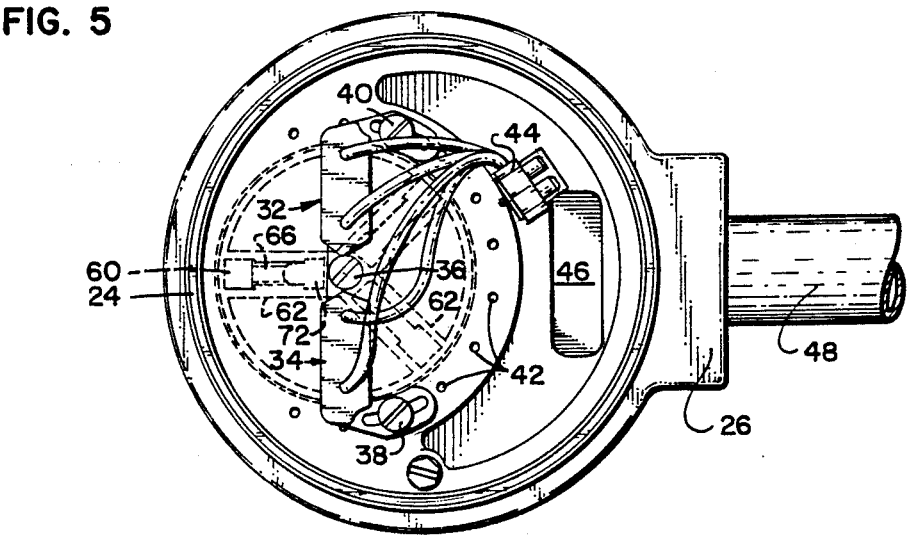
FIG. 5 is a plan view of the switch housing cavity taken generally along the line 5—5 of FIG. 3.

Referring to FIG. 4, it can be seen that magnet holder 54 is allowed to have some degree of movement within chamber 80 such that its rotational axis A may vary from perpendicular to wall 52 by the angle indicated at B. If this occurs, leaf spring 66 functions to hold magnet 60 against washer 84 retaining magnet 60 in a constant rotational plane perpendicular to axis A. The relative movement of magnet 60 in portion 64 in response to the position of holder 54 is illustrated at C. Spring clip 16 also allows there to be some misalignment between the connection of the rotary shaft 14 to the magnet holder 54. This is illustrated by the showing of clip 16 in solid and broken lines. As stated above, the misalignment feature is significant in that it provides some tolerance in mounting of the switch to the rotary shaft. Moreover, as the device is used over time, the rotational axis may fall out of precise alignment. Since a degree of misalignment is permitted, this does not affect the operation or accuracy of the switch.

Because of the misalignment feature the magnet 60 must be held in a constant rotational plane and relationship with respect to reed switches 32 and 34 as described above by spring 66. Such switches are typically very sensitive and if magnet were allowed to move away from the wall 52 as was permitted in the prior art U.S. Pat. No. 4,214,133, the reed switch may not be actuated at all or there may be problems in the accuracy of the timing of the indicator signal. This did not present a problem with respect to the prior art where the strength of the magnets on the opposite sides of the wall were sufficient to couple the magnets together regardless of the orientation of the magnet within chamber 80.

The present invention thus combines the advantages of the prior art switches disclosed in U.S. Pat. No. 4,214,133 with the advantages of reed switch actuation which is particularly useful in low voltage and low power applications. Moreover, the use of reed switches eliminates significant mechanical and structural components of the prior art.

I claim:
1. A rotary shaft position indicator and control, comprising,
 (a) a housing defining a switch chamber;
 (b) magnetically actuated switch means disposed within said switch chamber for providing indicator or control signals;
 (c) switch actuating means exterior of said housing, said switch actuating means comprising:
  (i) a magnet holder;
  (ii) flexible means for mounting said magnet holder to said housing for rotation about an axis, said mounting means permitting said rotational axis to misalign angularly with respect to an axis perpendicular to a wall of said housing;
  (iii) a magnet disposed on said holder;
  (iv) means for maintaining said magnet in a constant rotational plane with respect to said magnetically actuated switch means;
 (d) means for connecting said switch actuating means to the rotary shaft.
2. A rotary shaft position indicator and control in accordance with claim-L wherein said connecting means further comprises means for flexibly coupling the rotary shaft to said switch actuating means whereby the rotational axis of the rotary shaft may be misaligned with respect to the rotational axis of said switch actuating 3. A rotary shaft position indicator and control in accordance with claim 1 wherein said magnetically activated switch means comprises at least one reed switch.

4. A rotary shaft position indicator an control in accordance with claim 1 wherein said magnet holder comprises a plurality of magnet retaining members spaced apart angularly about said rotational axis of said magnet holder.

5. A rotary shaft position indicator and control in accordance with claim 1 wherein said magnet holder is mounted to a wall of said housing whereby said magnet is magnetically coupled through said wall to said magnetically actuated switch means.

6. The rotary shaft position indicator and control in accordance with claim 5 wherein said means for maintaining said magnet in a constant rotational plane comprises a spring retained within said magnet holder and biasing said magnet against said wall whereby said magnet is in a rotational plane perpendicular to an axis normal to said wall.

7. A rotary shaft position indicator and control comprising:
(a) a housing defining a switch chamber;
(b) at least one magnetically actuated reed switch disposed within said switch chamber for providing indicator or control signal;
(c) switch actuating means disposed exterior of said housing, said switch actuating means comprising:
  (i) a magnet holder having a plurality of magnet receiving members disposed circumferentially about a rotational axis of said magnet holder;
  (ii) flexible means for mounting said magnet holder to a wall of said housing for rotation about said axis;
  (iii) at least one magnet disposed in at least one of said magnet receiving members whereby said magnet is coupled through said wall of said housing through said magnetically actuated reed switch;
  (iv) spring means for biasing said magnet against said wall to maintain said magnet in a constant rotational plane normal to an axis perpendicular to said wall;
(d) means for coupling the rotary shaft to said switch actuating means.

* * * * *

UNITED STATES PATENT AND TRADEMARK OFFICE
CERTIFICATE OF CORRECTION

PATENT NO. : 4,831,350

DATED : May 16, 1989

INVENTOR(S) : John F. Rose

It is certified that error appears in the above-identified patent and that said Letters Patent is hereby corrected as shown below:

Col. 1, Line 12
 "t" should be --to--

Col. 3, Line 1
 "tee" should be --the--

Col. 3, Line 12
 "an" should be --and--

Col. 3, Line 16
 after "26" insert --.--

Col. 4, Line 68
 "Claim-L" should be --claim 1--

Signed and Sealed this

Fourteenth Day of November, 1989

*Attest:*

JEFFREY M. SAMUELS

*Attesting Officer*  *Acting Commissioner of Patents and Trademarks*